US005783631A

United States Patent [19]
Venkataswamy

[11] Patent Number: 5,783,631
[45] Date of Patent: *Jul. 21, 1998

[54] SELF-CURED RUBBER-THERMOPLASTIC ELASTOMER COMPOSITIONS

[75] Inventor: Krishna Venkataswamy, Akron, Ohio

[73] Assignee: Advanced Elastomer System, L.P., Akron, Ohio

[*] Notice: The term of this patent shall not extend beyond the expiration date of Pat. No. 5,589,544.

[21] Appl. No.: 686,782

[22] Filed: Jul. 26, 1996

[51] Int. Cl.$^6$ .................................................. C08L 53/00
[52] U.S. Cl. .................. 525/92 F; 525/119; 525/148; 525/176; 525/222
[58] Field of Search .................. 525/148, 176, 525/92 F, 119, 222

[56] References Cited

U.S. PATENT DOCUMENTS

| | | | |
|---|---|---|---|
| 4,327,199 | 4/1982 | Coran et al. | 525/176 |
| 4,782,110 | 11/1988 | Wolfe, Jr. | 524/522 |
| 4,820,774 | 4/1989 | Takao et al. | 525/708 |
| 4,871,810 | 10/1989 | Saltman | 525/133 |
| 5,300,573 | 4/1994 | Patel | 525/109 |
| 5,574,105 | 11/1996 | Venkataswamy | 525/179 |
| 5,589,544 | 12/1996 | Horrion | 525/176 |
| 5,591,798 | 1/1997 | Patel | 524/514 |

FOREIGN PATENT DOCUMENTS

| | | |
|---|---|---|
| 0 337 976 A2 | 10/1989 | European Pat. Off. . |
| 0 337 977 B1 | 1/1994 | European Pat. Off. . |

OTHER PUBLICATIONS

An article entitled "Self–vulcanizable ternary rubber blend based on epoxidized natural rubber, carboxylatednitrile rubber and polychloroprene rubber 1. Effect of blend ration, moulding time and fillers on miscibility" by R. Alex, P. P. De and S. K. De, published in *Polymer Science*, 1991, vol. 32, No. 13, pp. 2345–2350.

*Primary Examiner*—Randy Gulakowski
*Attorney, Agent, or Firm*—Daniel J. Hudak; Laura F. Shunk; William A. Skinner

[57] ABSTRACT

A thermoplastic elastomer composition has a plastic phase or matrix of an engineering thermoplastic such as an ester polymer and a crosslinked phase of self-cured acrylic rubber particles. The rubber particles are the reaction product of at least one functionalized acrylic rubber self-cured by a different functionalized acrylic rubber wherein the functional groups are generally a carboxyl, an epoxy, or hydroxyl, and the like. The composition can be dynamically vulcanized in the presence of an accelerator and desirably has a single low temperature brittle point.

19 Claims, No Drawings

5,783,631

1

SELF-CURED RUBBER-THERMOPLASTIC ELASTOMER COMPOSITIONS

FIELD OF INVENTION

The present invention relates to thermoplastic elastomers which are generally cured in the absence of curing agents by utilizing a blend of two or more self-curing acrylic rubbers having different functional reactive groups. More specifically, the present invention relates to the dynamic vulcanization of thermoplastic elastomers utilizing different functionalized acrylic rubbers.

BACKGROUND OF THE INVENTION

Heretofore, thermoplastic elastomer compositions containing acrylate rubber were cured utilizing crosslinking agents such as covalent or ionic type bonding curing agents. Representative examples of such crosslinking agents included various maleimides, various organic peroxides, various urethane resins, various polyols such as pentaerythritol or diols such as bisphenol-A, various polyamines such as diamines, various polyisocyanates, magnesium oxide, and epoxides such as the diglycidyl ethers of bisphenol-A.

SUMMARY OF THE INVENTION

A blend of two or more acrylic rubber components are self-cured in the presence of an engineering thermoplastic wherein one of the components is a functionalized acrylic rubber and at least one of the other components is an acrylic rubber containing a different functional group. The functional groups are typically a carboxyl, an epoxy, a hydroxyl group, or the like, and are generally pendent from the backbone of the polymer so that crosslinking occurs. The formed thermoplastic elastomer composition does not require any curing agents but only an accelerator such as a metal salt of a fatty acid. Such compositions can be formed by dynamic vulcanization and the composition possesses good physical properties such as high 100 percent modulus, high shore A hardness, and the like and have a single low temperature brittle point.

DETAILED DESCRIPTION OF THE INVENTION

The thermoplastic elastomer compositions of the present invention contain a plastic phase or matrix of generally any engineering thermoplastic polymer which is compatible with the two or more functionalized acrylic rubber components.

Suitable thermoplastic polymers include the various ester polymers such as polyester, copolyester, a polyester block copolymer, or polycarbonate, etc., an epoxy endcapped derivative thereof, and mixtures thereof. The various polyesters can be either aromatic or aliphatic or combinations thereof and are generally directly or indirectly derived from the reactions of diols such as glycols having a total of from 2 to 12 carbon atoms and desirably from about 2 to about 4 carbon atoms with aliphatic acids having a total of from 2 to 20 carbon atoms and desirably from about 3 to about 15 carbon atoms or from aromatic acids having a total of from about 8 to about 15 carbon atoms. Generally, aromatic polyesters are preferred such as polyethyleneterephthalate, polybutyleneterephthalate, polyethyleneisophthalate, polynaphthalenephthalate, and the like, as well as endcapped epoxy derivative thereof, e.g., a monofunctional epoxy polybutyleneterephthalate. Various polycarbonates can also be utilized and the same are esters of carbonic acid. A

2 suitable polycarbonate is that based on bisphenol A, i.e., poly(carbonyldioxyl,4-phenyleneisopropylidene-1,4-phenylene). The various ester polymers also include block polyesters such as those containing at least one block of a polyester and at least one rubbery block such as a polyether derived from glycols having from 2 to 6 carbon atoms, e.g., polyethylene glycol, or from alkylene oxides having from 2 to 6 carbon atoms. A preferred block polyester is polybutyleneterephthalate-b-polyethylene glycol which is available as Hytrel from DuPont.

The amount of the one or more engineering thermoplastics is generally from about 10 to about 90 parts by weight, desirably from about 15 to about 60 parts by weight and preferably from about 20 to about 40 parts by weight based upon 100 parts by weight of all of the two or more functionalized acrylic rubbers.

The self-curing functionalized acrylic rubber components are generally compatible with each other and also with the engineering thermoplastic. The two or more functionalized acrylic rubber components can be derived from an alkyl acrylate wherein the alkyl portion has from 1 to 10 carbon atoms with from 1 to 3 carbon atoms being desired. Specific examples include polymers of ethyl acrylate, butyl acrylate, ethyl-hexyl acrylate, and the like. Other suitable acrylic rubbers include copolymers of ethylene and the above noted acrylates wherein the amount of ethylene is desirably high, e.g., from about 10 to about 90 mole percent, desirably from about 30 to about 70 mole percent, and preferably from about 40 to about 60 mole percent of ethylene repeat groups based upon the total number of moles of ethylene and acrylate repeat groups in the copolymer, so as to produce a rubber having polar and non-polar portions. A highly preferred class of acrylic rubbers are the various acid functionalized polymers of ethylene and acrylate. Desirably, the acid is acrylic acid or methacrylic acid. Such terpolymers generally contain from about 35 to about 80 mole percent and desirably from about 45 to about 55 mole percent of ethylene repeat groups, generally from about 0.5 to about 10 mole percent and desirably from about 2 to about 8 mole percent of acid repeat groups, and generally from about 10 to about 60 mole percent and desirably from about 37 to about 53 mole percent of alkyl acrylate repeat groups based upon the total number of repeat groups in the terpolymer. A specific commercially available compound is Vamac G, manufactured by DuPont, which generally has about 50 mole percent ethylene, about 45 mole percent of methyl acrylate and about 5 mole percent of acrylic acid.

The functional group of the self-curing two or more acrylic rubbers can be an acid, i.e., carboxyl group, an epoxy group, a hydroxy group, and the like. While the type of acrylic rubber or component can be exactly the same, it is necessary that the pendent functional groups of at least two acrylic rubbers be different so that they can react with each other and form a self-cured rubber. Such functionalized acrylic rubber components are formed by utilizing various comonomers during polymerization of the above noted acrylic polymers. Suitable comonomers for adding hydroxyl groups include unsaturated alcohols having from about 2 to about 20 and desirably from 2 to about 10 carbon atoms. A specific example of a hydroxy functionalized acrylic rubber is Hytemp 4404 from Nippon-Zeon. To add pendent epoxy groups, suitable comonomers include unsaturated oxiranes such as oxirane acrylates wherein the oxirane group can contain from about 3 to about 10 carbon atoms and wherein the ester group of the acrylate is an alkyl having from 1 to 10 carbon atoms with a specific example being glycidyl acrylate. Another group of unsaturated oxiranes are the various oxirane alkenyl ethers wherein the oxirane group can have from about 3 to about 10 carbon atoms and the alkenyl group can also have from about 3 to about 10 carbon atoms with a specific example being allyl glycidyl ether. Examples of epoxy functionalized acrylic rubbers include Acrylate AR-53 and Acrylate AR-31 from Nippon-Zeon, and the like. To add pendent carboxylic acid groups, suitable comonomers include unsaturated acids having from 2 to about 15 carbon atoms and desirably from 2 to 10 carbon atoms. Examples of acid functionalized acrylic rubbers include terpolymers of ethylene-acrylate-carboxylic acids such as the above-noted Vamac G from DuPont, and various carboxyl functional acrylates sold by Nippon-Zeon, and the like. The amount of the functional groups within any acrylic polymer can be up to about 10 mole percent, desirably from about 0.5 to about 6 mole percent, and preferably from about 1 to about 4 mole percent of the polymer, that is, of the total repeat groups therein.

The amount of any one type of functionalized acrylic polymer can vary greatly such as from about 1 percent to about 99 percent by weight and more desirably from about 20 to about 80 percent by weight and preferably from about 40 to about 60 percent by weight based upon the total weight of all types of specific functionalized acrylic polymers utilized.

An important aspect of the present invention is that the thermoplastic elastomer compositions have a low temperature brittle point according to ASTM D-746 of at least minus 20, minus 30, or minus 40° C., i.e., –40° C. or lower. In order to achieve such a low temperature brittle point, it has been found that the utilization of a terpolymer of ethylene-acrylate-carboxylic acid monomers such as those described above is generally essential. Moreover, it has been unexpectedly found that utilization of such terpolymers result in only one brittle temperature as opposed to two or more brittle temperatures. In contrast, a blend of two different functionalized acrylate rubbers not containing the noted terpolymer generally yields two different brittle temperatures with each being that of the particular acrylate polymer of the blend.

Desirably, the thermoplastic elastomer compositions of the present invention are self-cured in the presence of an accelerator. Suitable accelerators include salts of fatty acids. The fatty acids generally have from 12 or 14 to 20 or 25 carbon atoms. Suitable cations include the alkaline as well as the alkaline earth metals, that is, Groups 1 and 2 of the Periodic Table, as well as the various transitional metals, for example, Groups 11 and 12 of the Periodic Table. Specific examples of accelerators include the sodium, potassium, magnesium, calcium, zinc, etc. salts of fatty acids such as palmitic acid, stearic acid, oleic acid, and the like, and mixtures thereof, with potassium stearate and magnesium stearate being preferred. The amount of such accelerators is generally from about 1 to about 10 and desirably from about 2 to about 6 parts by weight per 100 parts by weight based upon the total weight of all of the various functionalized acrylic rubber components.

The self-cured thermoplastic elastomer compositions of the present invention are substantially free of crosslinking or curing agents. That is, the amount of said crosslinking or curing agents is generally less than 0.5 parts by weight and preferably less than 0.25 parts by weight per 100 parts by weight of the total functionalized acrylic rubbers. Examples of conventional crosslinking agents which are avoided include various maleimides, various organic peroxides, various urethane resins, various polyols, various polyamines such as diamines, various polyisocyanates, magnesium oxides, various epoxides such as the diglycidyl ether of bisphenol A, and the like.

The self-curing functionalized acrylic rubber blends of the present invention when cured as in a manner set forth hereinbelow, generally achieves a high degree of cure, that is, crosslinking. The degree of cure is readily determined by the amount of undissolved functionalized acrylic rubber in toluene at 20° C. Generally, the self-cured thermoplastic elastomer compositions of the present invention achieve a degree of cure of from about 60 percent to about 90 percent by weight, and desirably from about 70 percent to about 85 or 90 percent by weight, i.e., undissolved functionalized acrylic rubber.

The compositions of the present invention can also contain various additives in conventional or suitable amounts. For example, various retardants can be utilized to prevent an unduly quick cure such as any quaternary ammonium salt. Other additives include various antioxidants, various ultraviolet light stabilizers such as various hindered amines, various processing aids, various colorants or pigments, various reinforcing agents or fillers such as clay, silica, carbon black, talc, and the like, various flame retardants, and various plasticizers such as the nonreactive sulfonamides and trimellitates.

The self-curing thermoplastic rubber compositions of the present invention desirably are cured via dynamic vulcanization. Dynamic vulcanization means vulcanizing the acrylate rubbers of the composition of the present invention under high shear and at self-cure temperatures. As a result, the rubber is generally crosslinked while being blended with a thermoplastic polymer. The rubber can thus be simultaneously crosslinked and dispersed as fine particles of a "microgel" within the thermoplastic, e.g., polyester, matrix, or form a crosslinked co-continuous phase with the plastic phase, or a combination thereof. Sources of high shear include Brabender mixers, Banbury mixers, extruders including twin screw extruders, and the like. A unique characteristic of the composition of the present invention is that while the elastomer rubber portion is crosslinked, the compositions nevertheless can be processed and reprocessed by conventional thermoplastic processing techniques and equipment such as extrusion, injection molding, compression molding and the like. An advantage of the thermoplastic elastomers of the present invention is that flashing, scrap, etc., can be salvaged and reprocessed.

The exact method of dynamic vulcanization can vary, but generally the self-curing acrylic rubber and functionalized rubber components, the various accelerators, and the thermoplastic are added to a high shear mixing device such as a Brabender and the composition heated to a temperature above the melting point of the thermoplastic and mixed. The mixing temperature is generally from about 180° C. to about 260° C., and desirably from about 220° C. to about 240° C. The composition is mixed until the torque curve levels off (substantial curing) at which time the composition is mixed for an additional short period of time, for example, about 2 minutes. After mixing and curing, the thermoplastic elastomer compositions were removed form the Brabender mixer and cold pressed into a pancake and subsequently compression molded into plaques for testing.

The thermoplastic elastomers of the present invention have good physical properties such as high Shore A modulus, high 100 percent modulus, and good low temperature properties.

Suitable uses include molded, extruded or shaped articles useful as vehicle (for example, automotive) parts such as seals, tubings, hoses, gaskets, diaphragms, bellows, and the like.

The invention will be better understood by reference to the following examples which serve to illustrate but not to limit the scope of the present invention.

EXAMPLES

The various polybutylene terephthalate/self-curing acrylic rubber blends were prepared according to the recipe set forth in Table I.

As apparent from Table II, although the compositions 2 through 6 of Table I did not contain any crosslinking agents, very desirable physical properties were obtained, such as ultimate tensile strength, elongation, 100 percent modulus, and the like.

In a manner similar to that set forth hereinabove with respect to Table I, thermoplastic elastomers were prepared from the recipes set forth in Table III (i.e., Examples 8–15), and the physical properties thereof are set forth in Table IV.

TABLE I

| Material | 1 | 2 | 3 | 4 | 5 | 6 | 7 |
|---|---|---|---|---|---|---|---|
| Celenex 2002[1] | 25 | 25 | 25 | 25 | 25 | 25 | 25 |
| AR31 Acrylic[2] | — | 37.5 | 37.5 | 37.5 | 37.5 | — | — |
| AR53 Arcylic[2] | — | — | — | — | — | 37.5 | 37.5 |
| AR71 Acrylic[2] | 75 | — | — | — | — | — | — |
| Vamac-G (MB)[3] | — | 37.5 | 37.5 | 37.5 | 37.5 | 37.5 | 37.5 |
| Flectol ODP[4] | 1.5 | — | — | — | — | — | — |
| Kenamid S221[5] | 1.5 | — | — | — | — | — | — |
| Hycar NPC-50[6] | 4.5 | — | — | — | — | — | — |
| Potassium Stearate | 3 | 3 | 3 | 6 | 6 | 3 | 6 |

NOTE:
[1]Celenex 2002: PBT Polyester
[2]AR31 and AR53 are epoxy functionalized ethyl acrylates and AR71 is a vinyl chloroacetate monomer functionalized acrylic elastomers from Nippon Zeon.
[3]Vamac-G (MB) has a .09 PHR antioxidant package
[4]An antioxidant from Harwick
[5]Kenamide S221 is a wax-type lubricant from Witco
[6]Hycar NPC-50 is a 50% active masterbatch of quaternary ammonium salt The above compositions were prepared using a Brabender mixer wherein the above parts are by weight. The rubber mixture containing the two or more different types of functionalized acrylic rubbers, the antioxidant, the lubricant, and the master batch of a quaternary ammonium salt were masticated and melt mixed and the thermoplastic then added. Once the thermoplastic was melted and the torque curve leveled off, potassium stearate was added as an accelerator. Mixing was continued until the torque once again levels off. Since the mixture is self-curing, at approximately 225° C., the time to cure was approximately from 5 to 15 minutes depending upon the types of rubber utilized.

The dynamic vulcanizates were pressed into a pancake and compression molded into plaques. Various physical tests were conducted and the properties thereof are set forth in Table II.

TABLE III

Experiments with Nippon Zeon Acrylics (Hycar 4404/Vamac G)

| Material | 8 | 9 | 10 | 11 | 12 | 13 | 14 | 15 |
|---|---|---|---|---|---|---|---|---|
| Celenex 2002 | 25 | 25 | 25 | 25 | 25 | 25 | 25 | 25 |
| AR31 | 37.5 | 37.5 | 37.5 | 37.5 | — | — | — | — |
| *Hytemp 4404 | — | — | — | 37.7 | 37.5 | 37.5 | 37.5 | 37.5 |
| Vamac-G (MB) | 37.7 | 37.7 | 37.7 | — | 37.7 | 37.7 | 37.7 | 37.7 |
| Flextol ODP | .75 | .75 | .75 | 1.5 | .75 | .75 | .75 | .75 |
| Kenamide S221 | .75 | .75 | .75 | 1.5 | .75 | .75 | .75 | .75 |
| Potassium Stearate | — | — | 3 | 3 | 3 | — | — | — |
| Magnesium Stearate | 3 | 3 | — | — | — | 3 | 7.5 | 15 |

*Hytemp 4404 is a hydroxy functionalized acrylate from BFGoodrich.

TABLE II

| Mechanical Properties: | 1 Control | 2 | 3 | 4 | 5 | 6 | 7 |
|---|---|---|---|---|---|---|---|
| UTS Strength ASTM D 412 in MPa | 7.96 | 10.98 | 11.17 | 9.98 | 6.85 | 9.64 | 7.94 |
| % Elongation ASTM D 412 | 220 | 283 | 296 | 225 | 146 | 247 | 169 |
| 100% Mod. ASTM D 412 in MPa | 4.14 | 4.46 | 4.37 | 5.16 | 5.12 | 4.81 | 5.28 |
| Tension set (after 10 sec.) %, ASTM D 412 | 12 | 17 | 19 | 14 | 13 | 17 | 14 |
| Shore A ASTM D 2240 | 71 | 74 | 74 | 74 | 72 | 72 | 70 |

TABLE IV

| Mechanical Properties: | 8 | 9 | 10 | 11 | 12 | 13 | 14 | 15 |
|---|---|---|---|---|---|---|---|---|
| UTS Strength ASTM D 412 in MPa | 5.81 | 6.04 | 12.02 | 7.85 | 8.38 | 4.47 | 6.33 | 9.33 |
| % Elongation ASTM D 412 | 562 | 560 | 278 | 199 | 139 | 300 | 257 | 199 |
| 100% Mod. ASTM D 412 in MPa | 2.61 | 2.24 | 4.90 | 4.77 | 6.19 | 2.34 | 3.82 | 6.74 |
| 200% modulus MPa | 4.36 | 4.03 | 8.58 | — | — | — | 6.03 | 9.36 |
| Tension Set (After 10 sec.) %, ASTM D 412 | 8.5 | 8.5 | 17 | 29.5 | 12.5 | 9.0 | 10 | 17 |
| Shore A ASTM D 2240 | 53 | 52 | 72 | 75 | 75 | 41 | 52 | 68 |
| Oilswell 70 hours @ 177° C. | 52 | 57 | 43 | 63 | 53 | 82 | 87 | 82 |

As apparent from Table IV. generally good physical properties were obtained utilizing no crosslinking agents and only a small amount of a metal salt accelerator.

In a manner as described with respect to Table I, various rubber blends having the recipe set forth in Table V were prepared and self-cured. The various compounds of Table V were tested for physical properties, the results of which are set forth in Table VI.

TABLE V

DVAs WITH INTERCURING RUBBER/RUBBER BLENDS IN PBT

| MATERIAL | 16 | 17 | 18 | 19 |
|---|---|---|---|---|
| PBT 2002[1] | 33.3 | 33.3 | 33.3 | 33.3 |
| ACRYLATE AR-31 | 50 | — | 50 | — |
| ACRYLATE AR-53 | — | 50 | — | — |
| VAMAC-G | 50 | 50 | — | 50 |
| ACRYLATE R40[2] | — | — | — | 50 |
| HYCAR 4404 | — | — | — | 50 |
| POTASSIUM STEARATE | 4 | 4 | 4 | 4 |
| HYTEMP NPC-50[3] | — | — | — | — |
| PARAPLEX G-62[4] | — | — | — | — |

[1]Celenex 2002 from Celanese.
[2]R-40 130 A2 is experimental acrylate rubber with carboxyl functionality from Nippon Zeon.
[3]An antioxidant mixture of Topanol CA, DLDPP, and calcium stearate, 1/1/0.5.

TABLE VI

| MATERIAL | 16 | 17 | 18 | 19 |
|---|---|---|---|---|
| UTS, MPa | 8.55 | 7.79 | 10.62 | 8.62 |
| % ELONGATION ASTM D 412 | 150 | 150 | 185 | 110 |
| 100% Modulus, MPa | 760 | 750 | 960 | 1080 |
| % TENSION SET | — | 11 | 23 | — |
| OIL SWELL (70 Hrs, 150° C.) | 36 | 34 | 5 | 38 |
| Compression Set % (70 Hrs, 150° C.) ASTM D-395 | 64 | 57 | 82 | 61 |
| Compression Set % (Annealed) | 67 | 47 | — | 53 |
| -40C LTB ASTM D-746 | P | P | F | P |
| SHORE A | 67 | 66 | 87 | 74 |

As apparent from Table VI, the self-cured functionalized acrylic blends of the present invention when utilizing an acrylate-ethylene-unsaturated carboxylic acid terpolymer yielded only a single low temperature brittle point (LTB), i.e., minus 40° C. or lower. In Example 18 wherein a terpolymer was not utilized, a low brittle point was not achieved.

While in accordance with the Patent Statutes, the best mode and preferred embodiment has been set forth, the scope of the invention is not limited thereto, but rather by the scope of the attached claims.

What is claimed is:

1. A thermoplastic elastomer composition, comprising: a thermoplastic polymer phase and a crosslinked rubber phase, said rubber phase comprising a self-cured blend derived from at least two functionalized acrylic rubbers substantially free of a curing agent, at least one of said functionalized acrylic rubbers having a functional group which is reactive and causes curing with a different functional group of another of said functionalized acrylic rubbers.

2. A thermoplastic elastomer composition according to claim 1, wherein said functional group is a hydroxy group, a carboxyl group, or an epoxy group, and wherein said rubber phase contains less than about 0.5 parts by weight of a curing agent per 100 parts by weight of said functionalized acrylic rubbers.

3. A thermoplastic elastomer composition according to claim 2, wherein at least one of said functionalized acrylic rubbers is derived from monomers containing said functional group and an acrylate or ethylene and acrylate monomers, and wherein said compatible thermoplastic is an ester polymer.

4. A thermoplastic elastomer composition according to claim 3, wherein said ester polymer is a polyester, a copolyester, a polycarbonate, a block polyester copolymer, or an epoxy end-capped derivative thereof, or combinations thereof, wherein the amount of said ester polymer is from about 15 parts to about 60 parts by weight per 100 parts by weight of said functionalized acrylic rubbers, including an accelerator, wherein said accelerator is a salt of a fatty acid in an amount of from about 1 to about 10 parts by weight per 100 parts by weight of said functionalized acrylic rubbers, wherein the amount of said curing agent is less than about 0.25 parts by weight, wherein at least one of said functionalized acrylic rubbers is an ethylene-alkyl acrylate-carboxylic acid terpolymer wherein the amount of ethylene repeat units is from about 35 to about 80 mole percent, wherein the amount of alkyl acrylate repeat groups is from about 10 to about 60 mole percent, and wherein the amount of carboxylic acid-containing repeat groups is from about 0.5 to about 10 mole percent.

5. A thermoplastic elastomer composition according to claim 4, and wherein said ester polymer is polyethyleneterephthalate, polybutyleneterephthalate, polyethyleneisophthalate, polynaphthaleneterephthalate, or an epoxy end-capped derivative thereof, or combinations thereof, wherein the amount of said ester polymer is from about 20 to about 40 parts by weight per 100 parts by weight of said functionalized acrylic rubbers, wherein said accelerator is potassium stearate or magnesium stearate, and wherein the amount of functional groups in said acrylic rubbers is from about 0.5 to about 6 mole percent based upon the total number of repeat groups in said functionalized acrylic polymer.

6. A thermoplastic elastomer composition according to claim 1, wherein said functionalized acrylate rubber is self-cured under shear in the presence of said thermoplastic polymer.

7. A thermoplastic elastomer composition according to claim 5, wherein said functionalized acrylate rubber is self-cured under shear in the presence of said polyester.

8. A thermoplastic elastomer composition according to claim 1, wherein said composition has a single low temperature brittle point.

9. A thermoplastic elastomer composition according to claim 4, wherein said composition has a single low temperature brittle point, and wherein said low temperature brittle point is at least minus 40° C.

10. A thermoplastic elastomer composition, comprising:
a self-cured rubber in a thermoplastic matrix, said rubber comprising a blend of at least one functionalized acrylic rubber cured by at least one different functionalized acrylic rubber, said functional groups being a carboxyl group, an epoxy group, a hydroxyl group, or combinations thereof, the amount of said functional groups being up to 10 mole percent based upon the total number of repeat unit groups in said functionalized acrylic rubber, and wherein said self-cured rubber has a degree of cure as measured by weight percent insoluble in toluene at 20° C. of from about 60 to about 90 percent.

11. A thermoplastic elastomer composition according to claim 10, wherein said thermoplastic polymer is a polyester, a copolyester, a polycarbonate, a block polyester copolymer, or an epoxy end-capped derivative thereof, or combinations thereof, wherein the amount of said thermoplastic polymer is from about 15 parts to about 60 parts by weight per 100 parts by weight of said functionalized acrylic rubbers, wherein at least one of said functionalized acrylic rubber is derived from monomers containing said functionalized group and acrylate monomers or ethylene and acrylate monomers, and wherein at least one of said functionalized acrylate rubbers is an ethylene-acrylate-acid terpolymer.

12. A thermoplastic elastomer composition according to claim 11, wherein said thermoplastic polymer is polyethyleneterephthalate, polybutyleneterephthalate, polyethyleneisophthalate, polynaphthaleneterephthalate, or an epoxy end-capped derivative thereof, or combinations thereof, wherein the amount of said functional groups in said functionalized acrylate rubber is from about 0.5 to about 6 mole percent, and wherein said degree of cure of said self-cured rubber is from about 70 percent to about 90 percent by weight.

13. A thermoplastic elastomer composition according to claim 12, including from about 1 to about 10 parts by weight of an accelerator per 100 parts by weight of said functionalized acrylic rubbers.

14. A thermoplastic elastomer composition according to claim 13, wherein the amount of ethylene is said terpolymer is from about 45 to about 55 mole percent, wherein the amount of acrylate in said terpolymer is from about 37 to about 50 mole percent, and wherein the amount of acid in said terpolymer is from about 2 to about 8 mole percent based upon the total number of repeat groups in said terpolymer.

15. A thermoplastic elastomer composition according to claim 10, wherein said composition has a single low temperature brittle point.

16. A thermoplastic elastomer composition according to claim 14, wherein said composition has a single low temperature brittle point, and wherein said low temperature brittle point is at least minus 40° C.

17. A process, comprising the steps of:
forming a functionalized acrylic rubber blend in a thermoplastic matrix polymer, said functionalized acrylic rubber blend comprising at least a first functionalized acrylic rubber wherein said functional group is a carboxyl group, an epoxy group, or a hydroxyl group and at least a second different functionalized acrylic rubber wherein said functional group is a carboxyl group, epoxy group, or a hydroxy group reactive to cause crosslinking with said first functional group.

18. A process according to claim 17, wherein said thermoplastic matrix contains an ester polymer in the amount of from about 10 parts to about 90 parts by weight per 100 parts by weight of said functionalized acrylic functionalized rubbers, wherein said thermoplastic polymer is a polyester, a copolyester, a polycarbonate, a block polyester copolymer, or an epoxy end-capped derivative thereof, or combinations thereof, wherein at least one of said functionalized rubber is derived from monomers containing said functional group and an acrylate monomer or ethylene and acrylate monomers.

19. A process according to claim 17, including self-curing said functionalized acrylic rubbers cured under shear in the presence of said thermoplastic polymer.

* * * * *